(12) United States Patent
Boucké

(10) Patent No.: US 12,359,445 B2
(45) Date of Patent: Jul. 15, 2025

(54) DECORATIVE PANEL SUITABLE FOR ASSEMBLING A FLOOR, CEILING OR WALL COVERING BY INTERCONNECTING A PLURALITY OF SAID PANELS WITH EACH OTHER, AND DECORATIVE COVERING OF SUCH INTERCONNECTED PANELS

(71) Applicant: I4F Licensing NV, Turnhout (BE)

(72) Inventor: Eddy Alberic Boucké, Menen (BE)

(73) Assignee: i4F Licensing NV, Turnhout (BE)

( * ) Notice: Subject to any disclaimer, the term of this patent is extended or adjusted under 35 U.S.C. 154(b) by 45 days.

(21) Appl. No.: 17/774,951

(22) PCT Filed: Nov. 6, 2020

(86) PCT No.: PCT/EP2020/081372
§ 371 (c)(1),
(2) Date: May 6, 2022

(87) PCT Pub. No.: WO2021/089836
PCT Pub. Date: May 14, 2021

(65) Prior Publication Data
US 2023/0399858 A1      Dec. 14, 2023

(30) Foreign Application Priority Data
Nov. 8, 2019   (NL) ....................................... 2024193

(51) Int. Cl.
*E04F 15/10*      (2006.01)
*B32B 3/06*       (2006.01)
(Continued)

(52) U.S. Cl.
CPC .............. *E04F 15/107* (2013.01); *B32B 3/06* (2013.01); *B32B 7/12* (2013.01); *B32B 13/14* (2013.01);
(Continued)

(58) Field of Classification Search
CPC . E04F 15/107; E04F 15/02038; E04F 15/102; E04F 2201/03
(Continued)

(56) References Cited

U.S. PATENT DOCUMENTS 3,625,468 A * 12/1971 Marcott ................ B28B 7/0035
                                                      249/153
4,426,820 A      1/1984 Terbrack et al.
(Continued)

FOREIGN PATENT DOCUMENTS

CN          202055464 U    11/2011
CN          107298456 A    10/2017
(Continued)

*Primary Examiner* — Brent W Herring
(74) *Attorney, Agent, or Firm* — The Webb Law Firm

(57) ABSTRACT

The invention relates to a decorative panel suitable for assembling a floor, ceiling or wall covering by interconnecting a plurality of said panels with each other. The panel has a substantially planar top surface, and a substantially planar bottom surface, at least four substantially linear side edges of which at least one pair of side edges are provided with interconnecting coupling means for interconnecting one panel with another, the panel having a laminated structure including a core layer having an upper side and a lower side and a decorative top layer connected to the upper side of the core layer. The core layer includes a layer of a cementitious mineral material which includes a cement and a dispersant. The invention further relates to a decorative covering, in particular a decorative floor covering, decorative ceiling covering, or decorative wall covering, including a plurality of interconnected decorative panels.

27 Claims, 3 Drawing Sheets

(51) Int. Cl.
*B32B 7/12* (2006.01)
*B32B 13/14* (2006.01)
*B32B 38/00* (2006.01)
*E04F 15/02* (2006.01)

(52) U.S. Cl.
CPC ...... *B32B 38/145* (2013.01); *E04F 15/02038* (2013.01); *E04F 15/102* (2013.01); *B32B 2262/04* (2013.01); *B32B 2264/04* (2013.01); *B32B 2266/049* (2016.11); *B32B 2266/08* (2013.01); *B32B 2305/08* (2013.01); *B32B 2305/30* (2013.01); *B32B 2307/72* (2013.01); *B32B 2307/7265* (2013.01); *B32B 2315/06* (2013.01); *B32B 2419/04* (2013.01); *E04F 2201/03* (2013.01)

(58) Field of Classification Search
USPC .......................................................... 428/703
See application file for complete search history.

(56) References Cited

U.S. PATENT DOCUMENTS

| | | | |
|---|---|---|---|
| 8,720,150 B2 | 5/2014 | Hannig | |
| 8,756,889 B2* | 6/2014 | LeBlang | E04B 1/80 52/309.4 |
| 8,931,228 B2* | 1/2015 | Wiercinski | C09J 7/381 428/351 |
| 11,225,800 B2 | 1/2022 | De Rick et al. | |
| 2011/0195241 A1* | 8/2011 | Yu | C04B 22/16 428/537.1 |
| 2013/0104485 A1* | 5/2013 | Meersseman | B27N 7/00 428/53 |
| 2014/0141160 A1* | 5/2014 | Strachan | B05D 7/50 427/209 |
| 2015/0047284 A1* | 2/2015 | Cappelle | E04F 15/02005 52/311.1 |
| 2015/0267418 A1 | 9/2015 | Vermeulen et al. | |
| 2017/0225428 A1* | 8/2017 | Muir | B32B 27/16 |
| 2017/0328072 A1* | 11/2017 | Hannig | E04F 15/105 |
| 2018/0238059 A1* | 8/2018 | Thomas | C04B 24/2641 |
| 2018/0258652 A1* | 9/2018 | Meersseman | E04F 15/02038 |
| 2019/0284804 A1 | 9/2019 | Ibrahim et al. | |
| 2020/0123788 A1* | 4/2020 | Baert | E04F 15/02188 |
| 2020/0308846 A1* | 10/2020 | Josefsson | E04F 13/076 |

FOREIGN PATENT DOCUMENTS

| | | | |
|---|---|---|---|
| DE | 102012000468 A1 | 7/2013 | |
| EA | 201891548 A1 | 1/2019 | |
| JP | 2977205 B2 | 11/1999 | |
| JP | 2011517308 A | 6/2011 | |
| JP | 201387555 A | 5/2013 | |
| JP | 5632351 B2 | 11/2014 | |
| WO | 2009111292 A2 | 9/2009 | |
| WO | 2012049577 A2 | 4/2012 | |
| WO | 2014033648 A1 | 3/2014 | |
| WO | WO-2015130169 A1 * | 9/2015 | ........ E04F 15/02038 |
| WO | 2016204681 A1 | 12/2016 | |
| WO | 2018215550 A1 | 11/2018 | |
| WO | 2019064113 A1 | 4/2019 | |
| WO | 2019137964 A1 | 7/2019 | |

* cited by examiner

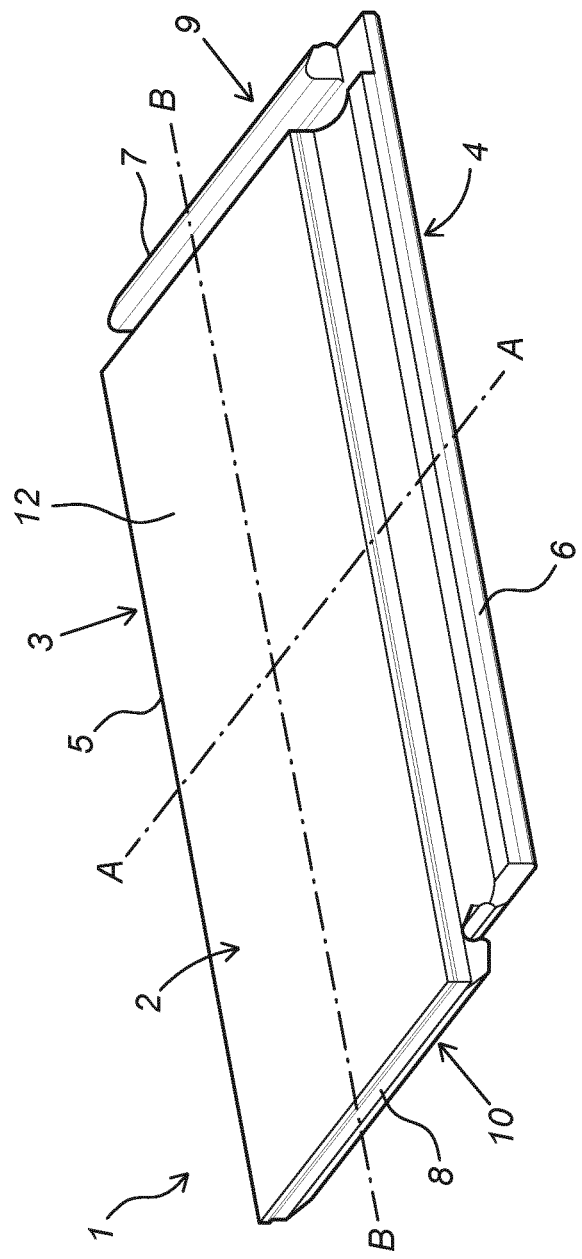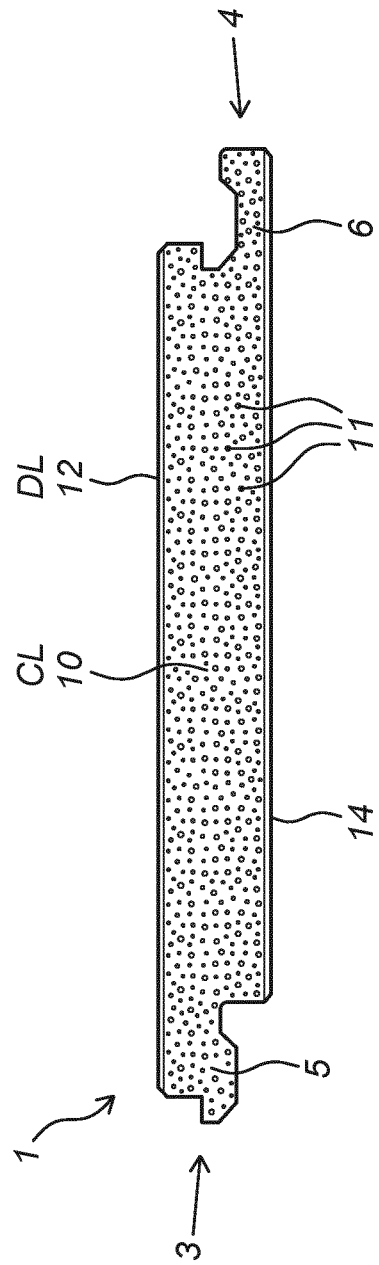

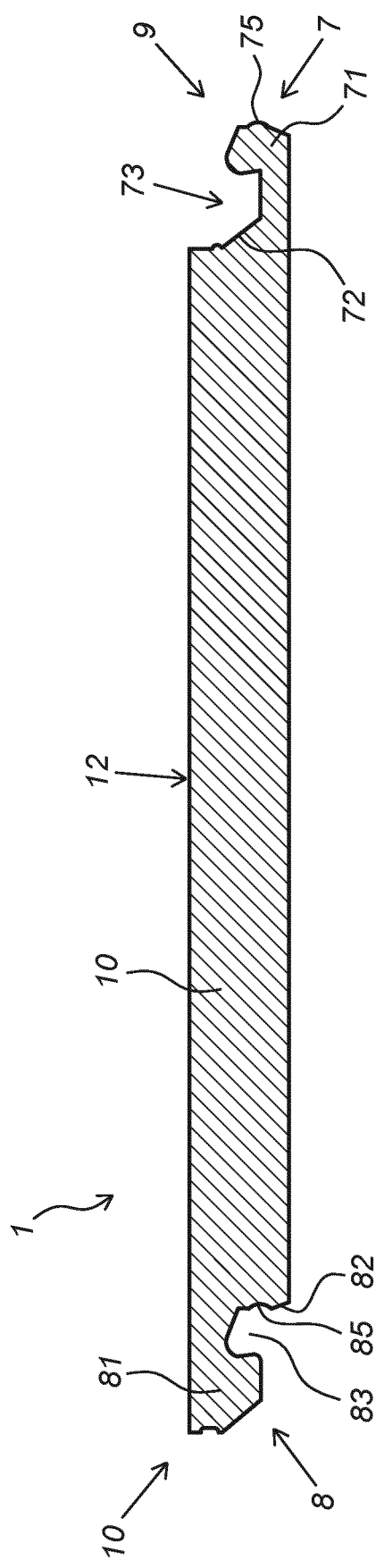
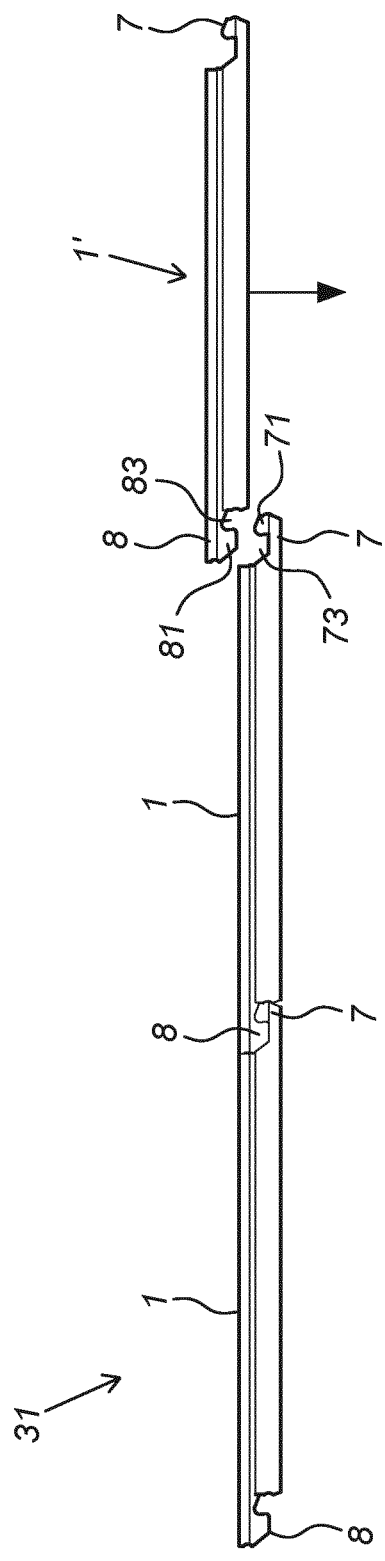

DECORATIVE PANEL SUITABLE FOR ASSEMBLING A FLOOR, CEILING OR WALL COVERING BY INTERCONNECTING A PLURALITY OF SAID PANELS WITH EACH OTHER, AND DECORATIVE COVERING OF SUCH INTERCONNECTED PANELS

CROSS-REFERENCE TO RELATED APPLICATIONS

This application is the United States national phase of International Application No. PCT/EP2020/081372 filed Nov. 6, 2020, and claims priority to The Netherlands Patent Application No. 2024193 filed Nov. 8, 2019, the disclosures of which are hereby incorporated by reference in their entirety.

BACKGROUND OF THE INVENTION

Field of the Invention

The present invention relates to a decorative panel suitable for assembling a floor, ceiling or wall covering by interconnecting a plurality of said panels with each other, as well as to a decorative covering constructed by such interconnected panels.

Description of Related Art

In particular, the invention relates to a decorative panel that has a substantially planar top surface, and a substantially planar bottom surface, at least four substantially linear side edges of which at least one pair of side edges are provided with interconnecting coupling means for interconnecting one panel with another,
the panel having a laminated structure comprising a core layer having an upper side and a lower side and a decorative top layer connected to the upper side of the core layer, wherein the core layer comprises a layer of a cementitious mineral material.

A main advantage of cementitious mineral material as a core layer, is that it offers an attractive stability to the panel when subjected to temperature fluctuations during regular use in comparison to a core layer made of a thermoplastic material. An additional advantage over thermoplastic material, is that the mineral material is fireproof. Furthermore, in view of their practical use, mineral material may have attractive properties in terms of thermal insulation, sound absorption and compressive strength.

A disadvantage of cementitious mineral material is that the manufacturing process consumes substantial time and energy, as the material is made from a slurry containing cement mixed with water that is poured into a mould to form a uniform layer, which is subsequently allowed to set, or harden out, at a raised temperature, wherein hydrated complexes of cement are formed and excess water is removed by heat.

SUMMARY OF THE INVENTION

In this context, substantial costs are saved when the excess of water used in the process is minimized. However, reducing the amount of water will compromise the fluidity of the slurry, which should be avoided in view of the requirement that the layer can be uniformly spread over the entire mould.

In order to mitigate the above problem, the invention proposes a decorative panel suitable for assembling a floor, ceiling or wall covering by interconnecting a plurality of said panels with each other,
wherein the panel has a substantially planar top surface, and a substantially planar bottom surface, at least four substantially linear side edges of which at least one pair of side edges are provided with interconnecting coupling means for interconnecting one panel with another,
the panel having a laminated structure comprising a core layer having an upper side and a lower side and a decorative top layer connected to the upper side of the core layer,
wherein the core layer comprises a layer of a cementitious mineral material which includes a cement and a dispersant.

In order to allow for a reduced amount of water in the slurry during preparation of the layer of cementitious mineral material, a dispersant is added to the slurry of water and cement.

Such a dispersant promotes the homogeneous dispersion of solid matter in the suspension and achieves a sufficient fluidity of the slurry at lower water contents. Effectively, the use of water in the slurry can be reduced by 40%, while still creating a sufficiently fluid slurry. In the field, the dispersant is also referred to as a superplasticizer, or 'plasticizer'.

The dispersant or superplasticizer as used in the present context of mineral slurries, is thus a compound which should be distinguished from another well-known type of plasticizer as used in (thermo)plastics for decreasing the attraction between individual polymer chains, and rendering plastics more flexible and durable.

Still, when using a dispersant in the present context of mineral slurries, the whole physical chemistry of the subsequent setting process of the cementitious mineral material is changed, because of the lower water content. For instance, the setting time of the material may be lengthened, and the adhesion of the core layer with a decorative top layer may be impeded. In particular it should be considered that when the material has a foam structure containing air bubbles, the size of the air bubbles can be changed, and thus the material as a whole could be compromised in terms of compressive strength.

Therefore, in the panel according to the invention, the dispersant preferably comprises polycarboxylate ethers (PCEs), and preferably comprises lignosulphonate (LS) as a second dispersant.

It was found that the use of such a dispersant, especially when mixed with the second dispersant, did not compromise the strength of a core layer of the cementitious mineral material, and thus offers a layer suitable for producing a decorative panel having the required properties for the intended use. Furthermore, in case the mineral material has a foam structure, the air bubble size was found to be controllable to an adequate extent.

When both the above dispersant compounds are applied, it is particularly effective when the content of lignosulphonate lies in the range of 1.0 to 30 wt. % of the total weight of polycarboxylate ethers and lignosulphonate, and more preferably in the range of 5.0 to 30 wt. % of said total weight.

Further preferably in the decorative panel according to the invention, the weight content of the dispersant relative to the cement weight, is at most 1%, possibly at most 0.5%.

Such relatively low content proved already sufficiently effective in reducing the water content when preparing the cementitious mineral material from the slurry.

In particular, it is preferred in the panel according to the invention, that the cement is a calcium based cement, a calcium silicate based cement, and/or a magnesium based cement.

Furthermore, in the panel according to the invention, it is especially preferred that the cementitious mineral material includes particulate material that is dispersed in the cementitious mineral material.

In such a material, the cement acts as a binder for the particulate material.

Examples of attractive cementitious mineral materials in the panel according to the invention, are materials which are composed of concrete, magnesia, aerated concrete, and/or gypsum.

It is preferred in the panel according to the invention, that the core layer comprises at least 50% by weight, preferably in between 50 and 90% by weight, of cementitious mineral material.

According to a preferred feature of the panel of the invention, a reinforcement layer is included in the core layer.

In a preferred embodiment of the panel according to the invention, a waterproof layer is situated between the core layer and the top layer, preferably in the form of a waterproof adhesive that adheres the top onto the core layer.

With respect to the preferred cementitious mineral materials encompassed by the invention, the following sections present the invention in more detail for each preferred material, i.e. aerated concrete, magnesia and gypsum.

Aerated Concrete

In the panel according to the invention, it is preferred that the cementitious mineral material comprises or consists of aerated concrete (foam concrete) which is composed of a matrix of concrete material in which air pockets in the form of cells are present, wherein
either the cells in the aerated concrete make up 60 to 85 vol. % of the total volume of the aerated concrete, or
the density of the aerated concrete is in the range of 400 to 800 kg/m3.

Typically, an aerated concrete is produced by autoclaving a concrete material at high temperature and pressure. In a preceding step, the concrete material is commonly produced by mixing a slurry of cement and water with dispersant, pouring the slurry in a mold, and allowing the mixture to set at a raised temperature.

The core layer containing aerated concrete offers attractive properties to the panel, such as a relatively low weight, adequate thermal insulation and good sound absorption. Furthermore, it has a sufficient strength for the intended use.

To further enhance these advantageous properties, it is preferred that the cells of the aerated concrete are for a major part of a closed cell type, the major part being preferably at least 80%, most preferably at least 90% of the cells.

Furthermore in view of enhancing these advantages, it is preferred that a major part of the cells in the aerated concrete are of a size which is sufficiently small to absorb water by capillary action.

In an especially preferred embodiment of the panel wherein the core layer is based on aerated concrete, the cement is a calcium silicate hydrate mineral, such as Tobermorite, i.e. Ca5Si6O16(OH)2·4H2O and/or Ca5Si6(O,OH)18·5H2O.

In a further preferred embodiment of the panel according to the invention, a particulate material is dispersed in the aerated concrete, which particulate material comprises sand, pulverized fuel ash, fly ash, lime, and/or aluminium oxide powder.

In addition, or alternatively, the particulate material may comprise cellulose based particles, preferably lignocellulose based particles such as wood particles. In particular, it is preferred that at least a part of the cellulose based particles are fibres.

Additional or alternative particulate material that may be included in the cementitious mineral material are so-called cementitious materials, including ground granulated blast furnace slag, silica fume, natural pozzolans, metakaolin, and calcined shale or clay.

The cellulose based particles in the form of wood particles, may be wood powder, wood shavings, wood wool, and/or wood chips. Instead of wood, another source of natural fibres may be used, such as hemp.

In a preferred embodiment, the core comprises at least one reinforcement layer, such as a textile layer, a cellulose layer, in particular a paper layer, a carbon fibre layer and/or a glass fibre layer. The reinforcement layer may be a woven or non-woven layer. In a more preferred embodiment, the core comprises at least two cementitious mineral layers, wherein at least one reinforcement layer is situated in between two cementitious layers. In this case, the core comprises typically three (or more) core layers. It is conceivable that at least one reinforcement layer is integrated within one or more cementitious mineral layers and/or may subdivide a cementitious mineral layer into two (virtual) cementitious mineral (sub)layers. It is imaginable that the cementitious mineral material is partially or entirely permeating holes formed in the reinforcement layer.

Magnesia

In the panel according to the invention, it is preferred that the cementitious mineral material comprises or consists of magnesia which comprises a magnesia cement based on at least one of the following compounds:
magnesium oxide and/or magnesium hydroxide, both preferably in hydrated form;
magnesium chloride;
magnesium oxychloride;
5Mg(OH)2MgCl2·8H2O;
Mg2(OH)ClCO3·3H2O;
magnesite, in particular hydromagnesite (Mg5(CO3)4(OH)2·4H2O);
monoammonium dihydrogen phosphate (NH4H2PO4);
struvite (NH4MgPO4·6H2O) and/or dittmarite (NH4MgPO4·H2O)
MgHPO4;
monopotassium phosphate (KH2PO4);
magnesium potassium phosphate hexahydrate (MgKPO4·6H2O);
at least one borate;
magnesium sulphate, in particular heptahydrate sulphate mineral epsomite (MgSO4·7H2O);
5Mg(OH)2·MgSO4·3H2O (513-phase) and/or 3Mg(OH)·2MgSO4·8H2O (318-phase);
5Mg(OH)2·MgSO4·5H2O (515-phase) and/or Mg(OH)·2MgSO4·7H2O (517-phase).

The above types of magnesia offer attractive properties to the panel, such as a relatively low weight, adequate thermal insulation and good sound absorption. Furthermore, it has a sufficient strength for the intended use.

Typically, the magnesia is produced by mixing a slurry of magnesia cement and water with dispersant, pouring the slurry in a mold, and allowing the mixture to set at a raised temperature.

Preferably, in the panel according to the invention, the magnesia further comprises particulate matter dispersed in the magnesia, which particulate matter preferably comprises cellulose based particles.

In particular, it is preferred that the cellulose based particles comprise lignocellulose, such as wood material, and more preferably at least a part of the cellulose based particles are fibres.

In addition, the magnesia may further comprise at least one filler selected from the group consisting of: steel, glass, polypropylene, wood, acrylic, alumina, curaua, carbon, cellulose, coconut, kevlar, nylon, perlon, polyethylene, PVA, rock wool, sisal, and fique.

It is preferred that in the panel according to the invention, the magnesia layer has at least a partially foamed structure containing pores.

The foamed structure of the magnesia layer further contributes to the relatively low weight, adequate thermal insulation and good sound absorption of the panel.

The foamed structure may comprise open pores (cells) and/or closed pores (cells), wherein preferably the majority of pores are of a closed type.

Gypsum

In the panel according to the invention, it is preferred that the cementitious mineral material comprises or consists of gypsum which comprises hydrated plaster according to the structural formula $CaSO_4 \cdot 2H_2O$.

In the gypsum mineral structure, a partially dehydrated form of gypsum, i.e. $CaSO_4 \cdot xH_2O$, wherein x rages from 0 to 0.6, acts as the cement. This dehydrated form of gypsum is also referred to as plaster.

Typically, the gypsum is produced by mixing a homogeneous slurry of plaster, water and dispersant, pouring the slurry in a mold, and allowing the mixture to set at a raised temperature.

Furthermore, it is preferred in the panel according to the invention, that the gypsum has a foamed structure containing pores.

The foamed structure can be accomplished by addition of a foaming agent to the initial slurry, such as alkylsulphate and/or alkylethersulphate. As such, a foamed gypsum having a relatively low density of 650 to 850 g/cm3 is achievable.

It is preferred that in the panel according to the invention, the total dispersant content in the gypsum is 0.05 wt % to 0.5 wt. %.

This range was found to be most effective in obtaining the advantages as discussed above.

General Features

Some preferred general features of the panel according to the invention relate to:
- the top layer comprising at least one decorative layer and at least one transparent wear layer covering said decorative layer;
- the panel comprising a backing layer attached to a lower side of the core layer;
- the panel thickness being between 3 and 10 mm;
- the panel has a rectangular contour, comprising four side edges;
- the pair of side edges of the panel are opposite side edges.

Preferably, in the panel according to the invention, the top layer comprises at least one decorative layer and at least one transparent wear layer covering said decorative layer. A suitable wear layer in this context, has a melting temperature of above 100 degrees Celsius, and is preferably made of polyurethane.

The decorative layer will be visible and will be used to provide the panel an attractive appearance. To this end, the decorative layer may have a design pattern, which can, for example be a wood grain design, a mineral grain design that resembles marble, granite or any other natural stone grain, or a colour pattern, colour blend or single colour to name just a few design possibilities.

The decorative top layer is preferably a printed decorative top layer. This means that a printed decorative image of the top layer is realized by painting and/or (ink jet) printing, in particular digital printing. The decorative image may be printed directly on top of the core. However, it is typically more preferred that the printed decorative layer comprises a base layer or film, in particular a thermoplastic base layer or thermoplastic film, onto which a decorative image is printed. Prior to or subsequently to the printing step, the base layer is attached, directly or indirectly, to the core, e.g. by means of fusing or gluing.

The decorative top layer is preferably only covering at least a part of the upper side of the core layer, Side walls and the rear surface of the core are preferably substantially free of said decorative top layer.

In particular, it is preferred that in the panel, the interconnecting coupling means are embodied as follows:

In the panel according to the invention, the interconnecting coupling means include respectively a first and a second coupling profile at a respective first and second side edge of the pair of side edges, wherein the first coupling profile comprises:
- an upward tongue,
- at least one upward flank lying at a distance from the upward tongue,
- an upward groove formed in between the upward tongue and the upward flank wherein the upward groove is adapted to receive at least a part of a downward tongue of a second coupling profile of another, identical panel, and
- preferably at least one first locking element, preferably provided at a distant side of the upward tongue facing away from the upward flank, and wherein the second coupling profile comprises:
- a first downward tongue,
- at least one first downward flank lying at a distance from the downward tongue,
- a first downward groove formed in between the downward tongue and the downward flank, wherein the downward groove is adapted to receive at least a part of an upward tongue of a first coupling profile of another, identical panel, and
- preferably at least one second locking element adapted for co-action with a first locking element of the other identical panel, said second locking element preferably being provided at the downward flank.

Preferably, the first locking element comprises a bulge and/or a recess, and wherein the second locking element comprises a bulge and/or a recess. The bulge is commonly adapted to be at least partially received in the recess of an adjacent coupled panel for the purpose of realizing a locked coupling, preferably a vertically locked coupling. It is also conceivable that the first locking element and the second locking are not formed by a bulge-recess combination, but by another combination of co-acting profiled surfaces and/or high-friction contact surfaces. In this latter embodiment, the at least one locking element of the first locking element and second locking element may be formed by a (flat of otherwise shaped) contact surface composed of a, optionally separate, plastic material configured to generate friction with the other locking element of another panel in engaged (coupled) condition.

It is further within the realm of the invention that the first coupling profile and the second coupling profile are configured such that in coupled condition a pretension is existing, which forces coupled panels at the respective edges towards each other, wherein this preferably is performed by applying overlapping contours of the first coupling profile and the second coupling profile, in particular overlapping contours of downward tongue and the upward groove and/or overlapping contours of the upward tongue and the downward groove, and wherein the first coupling profile and the second coupling profile are configured such that the two of such panels can be coupled to each other by means of a fold-down movement and/or a vertical movement, such that, in coupled condition, wherein, in coupled condition, at least a part of the downward tongue of the second coupling part is inserted in the upward groove of the first coupling part, such that the downward tongue is clamped by the first coupling part and/or the upward tongue is clamped by the second coupling part.

Preferably, the side of the upward tongue facing towards the upward flank is the inside of the upward tongue and the side of the upward tongue facing away from the upward flank is the outside of the upward tongue, and wherein the side of the downward tongue facing towards the downward flank is the inside of the downward tongue and the side of the downward tongue facing away from the downward flank is the outside of the downward tongue, wherein at least a part of the inside of the upward tongue is inclined towards or away from the upward flank, and wherein at least a part of the inside of the downward tongue is inclined towards or away from the downward flank. In this way a "closed-groove" coupling or an "open-groove" coupling can be realized between panels, dependent on the inclination direction of the insides of the upward tongue and downward tongue.

Furthermore, in the panel according to the invention, the panel comprises at least one third coupling profile and at least one fourth coupling profile located respectively at a third panel edge and a fourth panel edge, wherein the third coupling profile comprises:
  a sideward tongue extending in a direction substantially parallel to the upper side of the panel,
  at least one second downward flank lying at a distance from the sideward tongue, and
  a second downward groove formed between the sideward tongue and the second downward flank,
wherein the fourth coupling profile comprises:
  a third groove configured for accommodating at least a part of the sideward tongue of the third coupling profile of a second identical panel, said third groove being defined by an upper lip and a lower lip, wherein said lower lip is provided with an upward locking element,
wherein the third coupling profile and the fourth coupling profile are configured such that the third and fourth coupling profiles of two identical panels can be coupled to each other by means of a turning movement, which involves at least a part of the sideward tongue of a first panel being inserted into the third groove of the other identical panel, and wherein at least a part of the upward locking element of the other panel is inserted into the second downward groove of the first panel.

Preferably wherein at least a part of each coupling profile is integrally formed with the core. It is imaginable that the coupling profiles are entirely formed by profiling the edges of the core layer(s).

The invention also relates to a decorative covering, in particular a decorative floor covering, decorative ceiling covering, or decorative wall covering, comprising a plurality of mutually coupled decorative panels according to the invention. The covering may also be suitable for installation at vertical corners, such as at inside corners of intersecting walls, pieces of furniture, and at outside corners, such as at entry ways.

Preferred embodiments of the invention are illustrated in the non-limitative set of clauses presented below:

Clauses

1. Decorative panel suitable for assembling a floor, ceiling or wall covering by interconnecting a plurality of said panels with each other,
   wherein the panel has a substantially planar top surface, and a substantially planar bottom surface, at least four substantially linear side edges of which at least one pair of side edges are provided with interconnecting coupling means for interconnecting one panel with another,
   the panel having a laminated structure comprising at least one core layer having an upper side and a lower side and a decorative top layer, in particular a printed decorative top layer, connected, either directly or indirectly, to the upper side of the core layer,
   wherein the core layer comprises a layer of a cementitious mineral material which includes a cement and a dispersant.
2. Decorative panel according to clause 1, wherein the dispersant comprises polycarboxylate ethers (PCEs), and preferably comprises lignosulphonate (LS) as a second dispersant.
3. Decorative panel according to clause 2, wherein the content of lignosulphonate lies in the range of 1.0 to 30 wt. % of the total weight of polycarboxylate ethers and lignosulphonate, and preferably in the range of 5.0 to 30 wt. % of said total weight.
4. Decorative panel according to one of the preceding clauses, wherein the weight content of the dispersant relative to the weight of the cementitious mineral material, is at most 1%, possibly at most 0.5%.
5. Panel according to one of the preceding clauses, wherein the cement is a calcium based cement, a calcium silicate based cement, and/or a magnesium based cement.
6. Panel according to one of the preceding clauses, wherein the cementitious mineral material includes particulate material that is dispersed in the cementitious mineral material.
7. Panel according to one of the preceding clauses, wherein the cementitious mineral material is composed of concrete, magnesia, aerated concrete, and/or gypsum.
8. Panel according to one of the preceding clauses, wherein the core layer comprises at least 50% by weight, preferably in between 50 and 90% by weight, of cementitious mineral material.
9. Panel according to one of the preceding clauses, wherein a reinforcement layer is included in the core layer.
10. Panel according to one of the preceding clauses, wherein a waterproof layer is situated between the core layer and the top layer, preferably in the form of a waterproof adhesive that adheres the top onto the core layer.

11. Panel according to one of the preceding clauses, wherein the cementitious mineral material comprises or consists of aerated concrete which is composed of a matrix of concrete material in which air pockets in the form of cells are present, wherein
either the cells in the aerated concrete make up 60 to 85 vol. % of the total volume of the aerated concrete, or
the density of the aerated concrete is in the range of 400 to 800 kg/mm3.

12. Panel according to clause 11, wherein the cells are for a major part of a closed cell type, the major part being preferably at least 80%, most preferably at least 90% of the cells.

13. Panel according to one of the preceding clauses 11 or 12, wherein a major part of the cells in the aerated concrete are of a size which is sufficiently small to absorb water by capillary action.

14. Panel according to one of the preceding clauses 11-13, wherein the cement is a calcium silicate hydrate mineral, such as Tobermorite, i.e. Ca5Si6O16(OH)2·4H2O and/or Ca5Si6(O,OH)18·5H2O.

15. Panel according to one of the preceding clauses 11-13, wherein a particulate material is dispersed in the aerated concrete, which particulate material comprises sand, pulverized fuel ash, fly ash, lime, and/or aluminium oxide powder.

16. Panel according to one of the preceding clauses 1-10, wherein the cementitious mineral material comprises or consists of magnesia which comprises a magnesia cement based on at least one of the following compounds:
    magnesium oxide and/or magnesium hydroxide, both preferably in hydrated form;
    magnesium chloride;
    magnesium oxychloride;
    5Mg(OH)2·MgCl28H2O;
    Mg2(OH)ClCO3·3H2O;
    magnesite, in particular hydromagnesite (Mg5(CO3)4 (OH)2·4H2O);
    monoammonium dihydrogen phosphate (NH4H2PO4);
    struvite (NH4MgPO4·6H2O) and/or dittmarite (NH4MgPO4·H2O)
    MgHPO4;
    monopotassium phosphate (KH2PO4);
    magnesium potassium phosphate hexahydrate (MgKPO4·6H2O);
    at least one borate;
    magnesium sulphate, in particular heptahydrate sulphate mineral epsomite (MgSO4·7H2O);
    5Mg(OH)2MgSO4·3H2O (513-phase) and/or 3Mg (OH)2MgSO4·8H2O (318-phase);
    5Mg(OH)2MgSO4·5H2O (515-phase) and/or Mg(OH) 2MgSO4·7H2O (517-phase).

17. Panel according to clause 16, wherein the magnesia further comprises particulate matter dispersed in the magnesia, which particulate matter preferably comprises cellulose based particles.

18. Panel according to clause 16 or 17, wherein the cellulose based particles comprise lignocellulose, such as wood material, and preferably at least a part of the cellulose based particles are fibres.

19. Panel according to one of the preceding clauses 16-18, wherein the magnesia layer has at least a partially foamed structure containing pores.

20. Panel according to one of the preceding clauses 1-10, wherein the cementitious mineral material comprises or consists of gypsum which comprises hydrated plaster according to the structural formula CaSO4·2H2O.

21. Panel according to clause 20, wherein the gypsum has a foamed structure containing pores.

22. Panel according to clause 20, wherein the total dispersant content in the gypsum is 0.05 wt % to 0.5 wt. %.

23. Panel according to one of the foregoing clauses, wherein the interconnecting coupling means include respectively a first and a second coupling profile at a respective first and second side edge of the pair of side edges, wherein the first coupling profile comprises:
    an upward tongue,
    at least one upward flank lying at a distance from the upward tongue,
    an upward groove formed in between the upward tongue and the upward flank wherein the upward groove is adapted to receive at least a part of a downward tongue of a second coupling profile of another, identical panel, and
    at least one first locking element, preferably provided at a distant side of the upward tongue facing away from the upward flank, and wherein the second coupling profile comprises:
    a first downward tongue,
    at least one first downward flank lying at a distance from the downward tongue,
    a first downward groove formed in between the downward tongue and the downward flank, wherein the downward groove is adapted to receive at least a part of an upward tongue of a first coupling profile of another, identical panel, and
    at least one second locking element adapted for co-action with a first locking element of the other identical panel, said second locking element preferably being provided at the downward flank.

24. Panel according to any of the foregoing clauses, wherein the panel comprises at least one third coupling profile and at least one fourth coupling profile located respectively at a third panel edge and a fourth panel edge, wherein the third coupling profile comprises:
    a sideward tongue extending in a direction substantially parallel to the upper side of the panel,
    at least one second downward flank lying at a distance from the sideward tongue, and
    a second downward groove formed between the sideward tongue and the second downward flank,
    wherein the fourth coupling profile comprises:
    a third groove configured for accommodating at least a part of the sideward tongue of the third coupling profile of a second identical panel, said third groove being defined by an upper lip and a lower lip, wherein said lower lip is provided with an upward locking element,
    wherein the third coupling profile and the fourth coupling profile are configured such that the third and fourth coupling profiles of two identical panels can be coupled to each other by means of a turning movement, which involves at least a part of the sideward tongue of a first panel being inserted into the third groove of the other identical panel, and wherein at least a part of the upward locking element of the other panel is inserted into the second downward groove of the first panel.

25. Panel according to one of the preceding clauses, wherein the core layer comprises at least one reinforcement layer, such as a textile layer, cellulose layer, a carbon fibre layer and/or a glass fibre layer.
26. Panel according to clause 25, wherein the core layer comprises at least two layers of a cementitious mineral material which includes a cement and a dispersant, wherein at least one reinforcement layer is situated in between two layers of a cementitious mineral material
27. Panel according to one of the preceding clause, wherein at least a part of each coupling profile is integrally formed with the core.
28. Panel according to one of the preceding clauses, the printed decorative top layer is covering only at least a part only of the upper side of the core layer,
29. Panel according to one of the preceding clauses, wherein the side of the upward tongue facing towards the upward flank is the inside of the upward tongue and the side of the upward tongue facing away from the upward flank is the outside of the upward tongue, and wherein the side of the downward tongue facing towards the downward flank is the inside of the downward tongue and the side of the downward tongue facing away from the downward flank is the outside of the downward tongue, wherein at least a part of the inside of the upward tongue is inclined towards or away from the upward flank, and wherein at least a part of the inside of the downward tongue is inclined towards or away from the downward flank.
30. Panel according to one of the preceding clauses, wherein the printed decorative layer comprises a base layer or film, onto which a decorative image is printed.
31. Decorative covering, in particular a decorative floor covering, decorative ceiling covering, or decorative wall covering, comprising a plurality of interconnected decorative panels according to any of the clauses 1-30.

BRIEF DESCRIPTION OF THE DRAWINGS

The invention will be further explained with reference to the appended figures, wherein:
FIG. 1 shows in perspective a panel according to the invention;
FIG. 2 shows a transversal cross-section of a panel according to the invention;
FIG. 5 shows a longitudinal cross-section of a panel according to the invention;
FIG. 6 shows in longitudinal cross-section one embodiment of coupling profiles of panels that are interconnected according to the invention.

DESCRIPTION OF THE INVENTION

Figure 3:
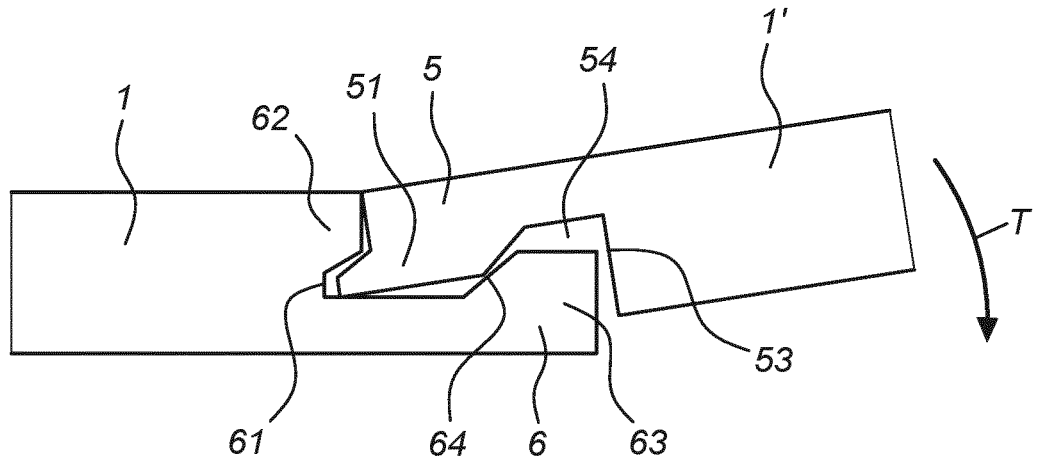
FIGS. 3 and 4 show in transversal cross-section two embodiments of coupling profiles of panels that are interconnected according to the invention.
Figure 4:
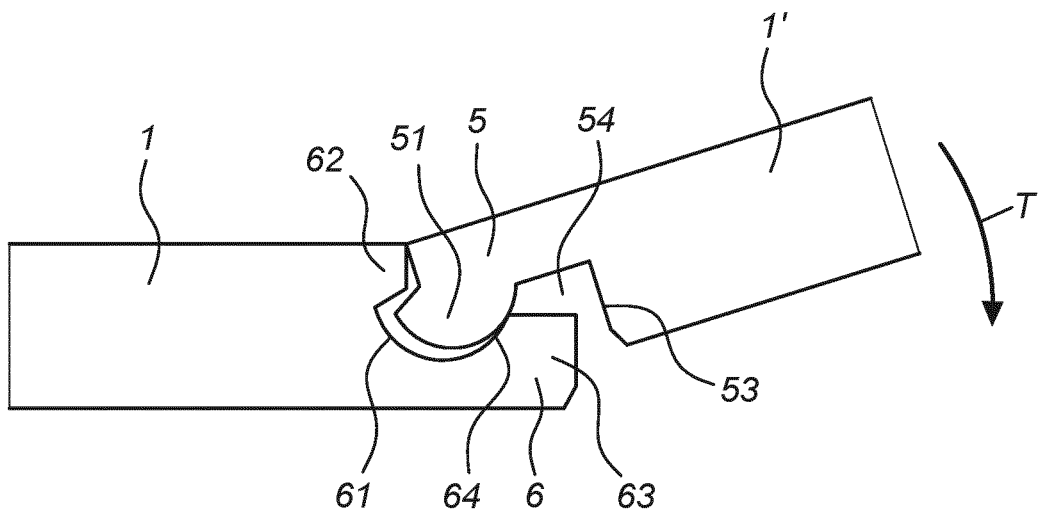

FIG. 1 shows a decorative panel 1 which upper side 2 is provided with a decorative top layer 12. The panel is of a rectangular shape having a length extending longitudinally along line B-B, and a width extending transversally along line A-A.
At side edges 9 resp. 10, a first coupling profile 7 resp. a second coupling profile 8 is provided. At side edges 3 resp. 4, a third coupling profile 5, resp. a fourth coupling profile 6 is provided.
FIG. 2 shows a transversal cross-section of a panel 1 shown in FIG. 1, along line A-A. The panel 1 has a core layer 10 that is made from a layer of aerated concrete, which contains small air bubbles 11 of a closed cell type. Onto the upper side of the aerated concrete layer an decorative top layer 12 is adhered, preferably by means of a thin waterproof adhesive layer. Onto the lower side of aerated concrete layer 10, a backing layer is adhered. The side edges 3 resp. 4, are provided with a third coupling profile 5, resp. a fourth coupling profile 6.
As a variant of the panel 1, the core layer 10 may alternatively be a foamed magnesia layer, or a foamed gypsum layer.
FIG. 3 shows the third and fourth coupling profiles 5 and 6, as depicted in FIG. 2, in detail when connecting two panels 1 and 1' with each other.
The third coupling profile 5 of panel 1', comprises a sideward tongue 51 extending in a direction substantially parallel to the upper side of the panel, one second downward flank 53 lying at a distance from the sideward tongue 51, and a second downward groove 54 formed between the sideward tongue 51 and the second downward flank 53.
The fourth coupling profile 6 of panel 1, comprises a third groove 61 configured for accommodating at least a part of the sideward tongue 51 of the third coupling profile 5 of a second identical panel 1', said third groove 61 being defined by an upper lip 62 and a lower lip 63, wherein said lower lip is provided with an upward locking element 64.
In the situation shown in FIG. 3, the third coupling profile and the fourth coupling profile 6 are configured such that the respective panels 1 and 1', can be coupled to each other by means of a turning movement as indicated by arrow T, which involves the sideward tongue of panel 1' being inserted into the third groove of the other identical panel 1, wherein the upward locking element 64 of the panel 1, is inserted into the second downward groove 54 of the panel 1'.
FIG. 4 shows analogously to FIG. 3, a different design of coupling profiles 5 and 6, having rounded features at tongue 51 and at third groove 61. The turning movement for coupling may also be referred to as a hinging movement in this alternative embodiment to FIG. 3. All other functional features and their numerals are the same as already defined for FIG. 3.
FIG. 5 shows a longitudinal cross-section of a panel 1 shown in FIG. 1, along line B-B. The panel 1 has a core layer 10 that is made from a layer of aerated concrete, which contains small air bubbles of a closed cell type. Onto the upper side of the aerated concrete layer 10 an decorative top layer 12 is adhered.
At side edges 9 resp. 10, a first coupling profile 7 resp. a second coupling profile 8 is provided.
The first coupling profile 7 comprises an upward tongue 71, an upward flank 72 lying at a distance from the upward tongue 71, an upward groove 73 formed in between the upward tongue 71 and the upward flank 72 wherein the upward groove 73 is adapted to receive at least a part of a downward tongue 81 of a second coupling profile 8 of another, identical panel, and at least one first locking element 75, preferably provided at a distant side of the upward tongue 71 facing away from the upward flank 72.
The second coupling profile 8 comprises a first downward tongue 81, a first downward flank 82 lying at a distance from the downward tongue 81, a first downward groove 83 formed in between the downward tongue 81 and the downward flank 82, wherein the downward groove 83 is adapted to receive at least a part of an upward tongue 71 of a first coupling profile 7 of another, identical panel, and a second locking element 85 adapted for co-action with a first locking element 75 of the other, identical panel, which is provided at the downward flank 82.

FIG. 6 shows how the first and second coupling profiles 7 and 8 of a panel can interact, when connecting the respective profiles 7 and 8 of a panel 1 and a panel 1', depicted at the far left. The panel 1' is hereby moved vertically downwards wherein the profiles 7 and 8 engage with each other by receiving upward tongue 71 in downward groove 83 and receiving downward tongue 81 in upward groove 73.

The invention claimed is:

1. A decorative floor panel suitable for assembling a floor covering by interconnecting a plurality of said panels with each other,
wherein the panel has a substantially planar top surface, and a substantially planar bottom surface, at least four substantially linear side edges of which at least one pair of side edges are provided with interconnecting coupling means for interconnecting one panel with another,
the panel having a laminated structure comprising at least one core layer having an upper side and a lower side and a printed decorative top layer connected, directly or indirectly, to the upper side of the core layer,
wherein a first panel side edge comprises a first coupling profile, and a second panel side edge comprises a second coupling profile designed to interconnect with a first coupling profile of a second, identical panel, both in horizontal direction and in vertical direction,
wherein the first coupling profile comprises:
an upward tongue,
at least one upward flank lying at a distance from the upward tongue,
an upward groove formed in between the upward tongue and the upward flank wherein the upward groove is adapted to receive at least a part of a downward tongue of a second coupling profile of another, identical panel, and
and wherein the second coupling profile comprises:
a first downward tongue,
at least one first downward flank lying at a distance from the downward tongue,
a first downward groove formed in between the downward tongue and the downward flank, wherein the downward groove is adapted to receive at least a part of an upward tongue of a first coupling profile of another, identical panel, and
wherein a third panel side edge comprises a third coupling profile, and a fourth panel side edge comprises a fourth coupling profile designed to interconnect with a third coupling profile of a another, identical panel, both in horizontal direction and in vertical direction, wherein the third coupling profile comprises:
a sideward tongue extending in a direction substantially parallel to the upper side of the panel,
at least one second downward flank lying at a distance from the sideward tongue, and
a second downward groove formed between the sideward tongue and the second downward flank,
wherein the fourth coupling profile comprises:
a third groove configured for accommodating at least a part of the sideward tongue of the third coupling profile of a second identical panel, said third groove being defined by an upper lip and a lower lip, wherein said lower lip is provided with an upward locking element,
wherein the third coupling profile and the fourth coupling profile are configured such that the third and fourth coupling profiles of two identical panels can be coupled to each other by means of a turning movement, which involves at least a part of the sideward tongue of a first panel being inserted into the third groove of the other identical panel, and wherein at least a part of the upward locking element of the other panel is inserted into the second downward groove of the first panel,
wherein the core layer comprises at least one layer of a cementitious mineral material which includes a cement and a dispersant, and
wherein the panel has a thickness between 3 mm and 10 mm,
wherein the core layer comprises at least one reinforcement layer,
wherein the reinforcement layer comprises a textile layer, a paper layer, or a carbon fibre layer, and
wherein the reinforcement layer is situated within the at least one core layer.

2. The decorative panel according to claim 1, wherein the dispersant comprises polycarboxylate ethers (PCEs), and comprises lignosulphonate (LS) as a second dispersant.

3. The decorative panel according to claim 2, wherein the content of lignosulphonate lies in the range of 1.0 to 30 wt. % of the total weight of polycarboxylate ethers and lignosulphonate.

4. A decorative panel according to claim 1, wherein the weight content of the dispersant relative to the weight of the cementitious mineral material, is at most 1%.

5. The panel according to claim 1, wherein the cement is a calcium based cement, a calcium silicate based cement, and/or a magnesium based cement.

6. The panel according to claim 1, wherein the cementitious mineral material includes particulate material that is dispersed in the cementitious mineral material.

7. The panel according to claim 1, wherein the cementitious mineral material is composed of concrete, magnesia, aerated concrete, and/or gypsum.

8. The panel according to claim 1, wherein the core layer comprises at least 50% by weight of the cementitious mineral material.

9. The panel according to claim 1, wherein a waterproof layer is situated between the core layer and the top layer, in the form of a waterproof adhesive that adheres the top onto the core layer.

10. The panel according to claim 1, wherein the cementitious mineral material comprises aerated concrete which is composed of a matrix of concrete material in which air pockets in the form of cells are present, wherein
either the cells in the aerated concrete make up 60 to 85 vol. % of the total volume of the aerated concrete, or the density of the aerated concrete is in the range of 400 to 800 kg/m3.

11. The panel according to claim 10, wherein the cells are for a major part of a closed cell type, the major part being at least 80%.

12. The panel according to claim 10, wherein a major part of the cells in the aerated concrete are of a size which is sufficiently small to absorb water by capillary action.

13. The panel according to claim 10, wherein the cement is a calcium silicate hydrate mineral, the mineral comprising Tobermorite, Ca5Si6O16(OH)2·4H2O or Ca5Si6(O,OH)18·5H2O.

14. The panel according to claim 10, wherein a particulate material is dispersed in the aerated concrete, which particulate material comprises sand, pulverized fuel ash, fly ash, lime, and/or aluminium oxide powder.

15. The panel according to claim 1, wherein the cementitious mineral material comprises magnesia which comprises a magnesia cement based on at least one of the following compounds:
- magnesium oxide and/or magnesium hydroxide, both in hydrated form;
- magnesium chloride;
- magnesium oxychloride;
- $5Mg(OH)_2 \cdot MgCl_2 \cdot 8H_2O$;
- $Mg_2(OH)ClCO_3 \cdot 3H_2O$;
- magnesite, in particular hydromagnesite ($Mg_5(CO_3)_4(OH)_2 \cdot 4H_2O$);
- monoammonium dihydrogen phosphate ($NH_4H_2PO_4$);
- struvite ($NH_4MgPO_4 \cdot 6H_2O$) and/or dittmarite ($NH_4MgPO_4 \cdot H_2O$)
- $MgHPO_4$;
- monopotassium phosphate ($KH_2PO_4$);
- magnesium potassium phosphate hexahydrate ($MgKPO_4 \cdot 6H_2O$);
- at least one borate;
- magnesium sulphate, in particular heptahydrate sulphate mineral epsomite ($MgSO_4 \cdot 7H_2O$);
- $5Mg(OH)_2 \cdot MgSO_4 \cdot 3H_2O$ (513-phase) and/or $3Mg(OH)_2 \cdot MgSO_4 \cdot 8H_2O$ (318-phase);
- $5Mg(OH)_2 \cdot MgSO_4 \cdot 5H_2O$ (515-phase) and/or $Mg(OH)_2 \cdot MgSO_4 \cdot 7H_2O$ (517-phase).

16. The panel according to claim 15, wherein the magnesia further comprises particulate matter dispersed in the magnesia, which particulate matter comprises cellulose based particles.

17. The panel according to claim 16, wherein the cellulose based particles comprise lignocellulose, wherein the lignocellulose comprises wood material or at least a part of the cellulose based particles are fibres.

18. The panel according to claim 15, wherein the magnesia layer has at least a partially foamed structure containing pores.

19. The panel according to claim 1, wherein the cementitious mineral material comprises gypsum which comprises hydrated plaster according to the structural formula $CaSO_4 \cdot 2H_2O$.

20. The panel according to claim 19, wherein the gypsum has a foamed structure containing pores.

21. The panel according to claim 19, wherein the total dispersant content in the gypsum is 0.05 wt % to 0.5 wt. %.

22. The panel according to claim 1, wherein the at least one core layer comprises at least two layers of the cementitious mineral material which includes the cement and the dispersant, wherein the at least one reinforcement layer is situated in between the two layers of the cementitious mineral material.

23. The panel according to claim 1, wherein at least a part of each coupling profile is integrally formed with the core.

24. The panel according to claim 1, wherein the printed decorative top layer is covering only at least a part only of the upper side of the core layer.

25. The panel according to claim 1, wherein the side of the upward tongue facing towards the upward flank is the inside of the upward tongue and the side of the upward tongue facing away from the upward flank is the outside of the upward tongue, and wherein the side of the downward tongue facing towards the downward flank is the inside of the downward tongue and the side of the downward tongue facing away from the downward flank is the outside of the downward tongue, wherein at least a part of the inside of the upward tongue is inclined towards or away from the upward flank, and wherein at least a part of the inside of the downward tongue is inclined towards or away from the downward flank.

26. The panel according to claim 1, wherein the printed decorative layer comprises a base layer or film, onto which a decorative image is printed.

27. A decorative floor covering, comprising a plurality of interconnected decorative panels according to claim 1.

* * * * *